Patented Sept. 7, 1937

2,092,296

UNITED STATES PATENT OFFICE 2,092,296

CAN COATING

Vanderveer Voorhees, Hammond, Ind., assignor to Standard Oil Company, Chicago, Ill., a corporation of Indiana No Drawing. Application September 30, 1935, Serial No. 42,893

7 Claims. (Cl. 99—181)

This invention relates to a new and improved composition for the coating of cans or other containers and particularly for the coating of the interiors of tin-plated cans to prevent corrosion of the can and contamination of the canned material. The invention also relates to cans or other containers to which such coatings have been applied and it further relates specifically to methods of storing and transporting malted beverages in cans and other containers.

In the canning of various foods and beverages using the customary commercial cans made from tin-plate, serious difficulty is often encountered from the corrosion of the can and/or from the contamination of the material contained in the can in contact with it. As a means of combating this problem such cans have in the past been given interior coatings of various types such as varnishes, shellac, etc., but none of these have been entirely satisfactory.

It is an object of my invention to provide a superior material for the coating of cans and other containers and particularly for the coating of tin-plated cans to be filled with food products, including beverages. Another object of my invention is to provide a material of this type which will adhere tenaciously to the can. Still another object is to provide a material which is biologically harmless and free from taste and odor. A further object is to provide a material of this type which can be applied very easily and rapidly. Still another object is to provide a can coating material having a high degree of plasticity. Yet another object is to provide such a material which will be "self healing", that is, which will tend to reform on the surface of the can if the film of coating material is temporarily disturbed.

Other objects of my invention are to provide a superior can having an interior coating of the type previously referred to, and to provide methods for the coating of cans. Further and more detailed objects of my invention will become apparent as the description thereof proceeds.

It has been found that when certain olefinic hydrocarbons are polymerized under appropriate conditions substances having very unusual properties are produced. These products are viscous, plastic, resinous solids of a highly "tacky" and sticky nature and have very high average molecular weights, usually within the range from 1,000 to 12,000 and preferably from 1,500 to 8,000. They are essentially hydrocarbon in chemical composition and are practically saturated. It is, however, quite possible that in molecules of the extreme size of those here involved one or more atoms other than carbon and hydrogen may be present and one or more olefinic linkages may be present. This does not detract from the fact that they are essentially saturated hydrocarbons in chemical composition. This is highly important for purposes of my invention since saturated hydrocarbons are usually colorless, odorless and biologically harmless.

Resinous substances of the type described in the last paragraph can be produced in various ways from various materials by processes of polymerization, condensation, and/or hydrogenation.

The preferred resin is made by the polymerization of isobutylene with aluminum chloride or preferably boron trifluoride. In making this resin it is desirable to carry out the polymerization at a low temperature, for instance from 0° F. to —100° F. or even lower. The polymerization reaction may be carried out in the presence of a solvent such as naphtha, hexane, pentane, butane or propane, if desired.

In some cases it will be found that a small amount of synthetic oil is made along with the resin. This may, if desired, be removed from the resin by extraction with solvents such as propane or acetone-benzol, by vacuum distillation, etc.

Numerous other unsaturated hydrocarbons may be polymerized to make resins suitable for my purpose. Among these may be mentioned iso-hexene, cyclo-hexene, trimethyl ethylene, iso-amylene, and other mono-olefins. Branched chain, and particularly iso, mono-olefins are preferred.

The starting material, catalysts, and polymerization conditions for the production of a resin having certain desired properties can readily be determined by experiment. One preferred method is to treat isobutylene at a temperature of —40° F., with about 0.1% to 0.5% by weight of boron trifluoride. Thus, the isobutylene which is liquid at —40° F., may be held in a vessel surrounded by a refrigerating bath and boron trifluoride gas may be led in with constant stirring until the desired plastic, viscous resin is produced. The reaction under these conditions produces a resin having a degree of plasticity which is usually highly desirable in connection with my invention. The resin thus produced may be purified by washing with a 10% to 20% aqueous solution of sodium hydroxide and then with water.

If the resin produced is not entirely colorless and odorless it can be rendered so by treatment, in light hydrocarbon solution or otherwise, with sulfuric acid, fuller's earth, or other treating agent as in the manufacture of refined petroleum oils.

In applying these resins to a can or other container, they may advantageously be dissolved in a volatile solvent, preferably a hydrocarbon solvent. A light naphtha is suitable for this purpose and such hydrocarbons as hexane, pentane, butane, propane and mixtures containing them are suitable. The resin may suitably be dissolved in 2 to 20 times its own volume of solvent and may then be applied to the interior of the can or other container by spraying. The solvent can readily be evaporated by applying a blast of air or preferably a suction device to an opening in the can. When a volatile solvent is used, it will be found that it can be completely removed with ease to leave a thin but highly adhesive coating on the interior of the can. The coating may suitably be a film .001 inch to .01 inch in thickness.

Alternatively, a solution of resin may be placed in the can, sloshed about to secure contact with all portions of the interior and then poured off. The evaporation of the solvent from the film remaining on the can will leave a very thin film of resin which will be sufficient to protect the interior of the can from rusting and prevent products contained in it from contamination.

Not only are these resins highly adhesive but they are also substantially odorless, tasteless and biologically inert so that even though some of the resin became disengaged from the can and got into the food product, there would be no undesirable effect. However, these resins are extremely water insoluble and cling tenaciously to metals. They therefore do not contaminate ordinary food products.

These resins are especially useful in preventing corrosion under the severe conditions occurring when a can of food product is opened and allowed to stand while still partially filled with the food product.

My invention is particularly applicable to the canning of beverages, for example malt liquors such as beer, and liquid food products such as syrups, fruit juices, etc. However, it is also applicable to the canning of fruits, vegetables, and certain meat products which do not contain fats or oils.

While I have described my invention in connection with certain specific embodiments, it is to be understood that I am not limited thereby but only to the broadest valid scope of the appended claims.

I claim:
1. The method of storing and transporting malted beverages in metal cans whereby said beverages are prevented from acquiring undesirable flavors from said cans comprising initially completely coating the interior surfaces of said cans with a thin layer of a viscous, adhesive, tasteless, chemically inert, water insoluble synthetic hydrocarbon resin resulting from the catalytic polymerization at low temperatures of liquid isobutylene.

2. The method of claim 1 wherein the syntheic hydrocarbon resin is produced by the polymerization of liquid isobutylene at a temperature between 0 and −100° F.

3. The method of claim 1 wherein the catalyst employed in the polymerization of the said liquid isobutylene is boron trifluoride.

4. A container for food and beverage products which are deleteriously affected by contact with metal, comprising a metal receptacle and a viscous metal adhesive coating completely covering the interior thereof, the principal ingredient of which is a high molecular weight resin resulting from the low temperature catalytic polymerization of isobutylene.

5. A container for food and beverage products which are deleteriously affected by contact with metal, comprising a tin-plated, sheet-iron receptacle and a viscous metal adhesive coating completely covering the interior thereof, the principal ingredient of which is a high molecular weight resin resulting from the low temperature catalytic polymerization of isobutylene.

6. A container for food and beverage products which are deleteriously affected by contact with metal, comprising a metal receptacle and a viscous metal adhesive coating completely covering the interior thereof, the principal ingredient of which is a high molecular weight resin resulting from the polymerization of liquid isobutylene in the presence of a catalyst selected from the class consisting of aluminum chloride and boron trifluoride.

7. A container for food and beverage products which are deleteriously affected by contact with metal, comprising a metal receptacle and a viscous metal adhesive coating completely covering the interior thereof, the principal ingredient of which is a substantially saturated hydrocarbon resin resulting from the catalytic polymerization of a liquid olefin selected from the class consisting of isohexene, cyclohexene, trimethyl ethylene, isoamylene and isobutylene.

VANDERVEER VOORHEES.